United States Patent [19]

Etoh et al.

[11] Patent Number: 5,553,212
[45] Date of Patent: Sep. 3, 1996

[54] METHOD AND APPARATUS FOR SOLVING NUMERICAL PLANNING PROBLEMS WITH INEQUALITIES ON A COMPUTER SYSTEM

[75] Inventors: Hiroaki Etoh, Kawasaki; Keiichi Maruyama, Ohmiya, both of Japan

[73] Assignee: International Business Machines Corporation, Armonk, N.Y.

[21] Appl. No.: 884,348

[22] Filed: May 18, 1992

[30] Foreign Application Priority Data

May 17, 1991 [JP] Japan ................................. 3-140710

[51] Int. Cl.⁶ .................................................. G06T 11/00
[52] U.S. Cl. ........................... 395/140; 395/155; 395/161
[58] Field of Search ........................... 395/140, 145–148, 395/155–161, 500, 600; 364/700, 709.12, 710.05–710.09, 710.1, 710.11; 434/215

[56] References Cited

U.S. PATENT DOCUMENTS

| | | |
|---|---|---|
| 4,674,042 | 6/1987 | Hernandez et al. . |
| 4,674,043 | 6/1987 | Hernandez et al. . |
| 5,189,633 | 2/1993 | Bonadio .............................. 364/709.12 |
| 5,281,145 | 1/1994 | Sidrak .................................... 434/215 |

FOREIGN PATENT DOCUMENTS

| | | |
|---|---|---|
| 59-176821 | 10/1984 | Japan . |
| 59-194258 | 11/1984 | Japan . |
| 2-73458 | 3/1990 | Japan . |

OTHER PUBLICATIONS

Mathcad Manual, pp. 231–249, (1991).

*Primary Examiner*—Almis R. Jankus
*Attorney, Agent, or Firm*—Volel Emile; Andrew J. Dillon

[57] ABSTRACT

It is aimed to solve numerical planning problems in a manner better reflecting planner's intention. Variables of a numerical planning problem are displayed as graphical objects on a display unit, guidance constraints are added to corresponding variables by manipulating graphics objects through a mouse, and corresponding variable values are modified through manipulation to the graphics objects. The planner can confirm guidance constraints set to the graphics objects by color display. New solution is obtained under constraints oriented to the problem and guidance constraints by the operations research procedure using the distance from a preceding solution as an objective function.

12 Claims, 15 Drawing Sheets

| VARIABLE INFORMATION | | |
|---|---|---|
| NAME | CONSTRAINT ATTRIBUTE | VALUE |
| B2 | | ------- |
| B3 | | 236008 |
| B4 | | ------- |
| B5 | | |

A ── GUIDANCE CONSTRAINTS

B4<149659
B4=1045045

+

B ── PROBLEM CONSTRAINTS

B2+B3+B4+B5=B6
B6=1319117
2.16 * B2/100=D2
7.48 * B3/100=D3
5.81 * B4/100=D4
0.00 * B5/100=D5
D2+D3+D4+D5=D6
B3>200000
B4<1050000

=

C ── OBJECTIVE FUNCTION

$\min\{(B2-149659)^2 + \ldots\ldots + (D6-32801.6)^2\}$

FIG. 8

| | A | B | C | D |
|---|---|---|---|---|
| | | | SPREAD SHEET | |
| 1 | ITEM | BUDGET | PROFIT RATIO | PROFIT |
| 2 | CASH | 149659 | 2.16 | 1616.3 |
| 3 | SECURITIES | 236008 | 7.48 | 8826.7 |
| 4 | LOANED MONEY | 1045046 | 5.81 | 30358 |
| 5 | REAL ESTATE | 23404 | 0.00 | 0.0 |
| 6 | TOTAL ASSETS | 1319117 | 2.49 | 32801.6 |

FIG. 12A

| | A | B | C | D |
|---|---|---|---|---|
| | | SPREAD SHEET | | |
| | ITEM | BUDGET | PROFIT RATIO | PROFIT |
| 1 | ITEM | BUDGET | PROFIT RATIO | PROFIT |
| 2 | -------- | -------- | -------- | -------- |
| 3 | SECURITIES | 236008 | 7.48 | 8826.7 |
| 4 | -------- | -------- | -------- | -------- |
| 5 | -------- | -------- | -------- | -------- |
| 6 | TOTAL ASSETS | -------- | -------- | -------- |

FIG. 12B

| | A | B | C | D |
|---|---|---|---|---|
| | | SPREAD SHEET | | |
| | INPUT CONSTRAINT EXPRESSION | | > 200000 | |
| 1 | ITEM | BUDGET | PROFIT RATIO | PROFIT |
| 2 | -------- | -------- | -------- | -------- |
| 3 | SECURITIES | 236008 | 7.48 | 8826.7 |
| 4 | -------- | -------- | -------- | -------- |
| 5 | -------- | -------- | -------- | -------- |
| 6 | TOTAL ASSETS | -------- | -------- | -------- |

METHOD AND APPARATUS FOR SOLVING NUMERICAL PLANNING PROBLEMS WITH INEQUALITIES ON A COMPUTER SYSTEM

TECHNICAL FIELD

This invention relates to a method and a system for solution of numerical planning problems, in which variable values are iteratively determined under constraints expressed by one or more equalities or inequalities and, more particularly, to those in which a planner can progressively approach better solutions through his/her interactive manipulation.

BACKGROUND ART

This invention is directed to how to select a set of variable values under conditions which satisfy one or more equalities or inequalities. This is a problem often experienced in the field of business such as budget planning, working of assets, and so forth, or in the field of the manufacturing industry. Although one solution is definitely determined by numerical optimization in usual operations research, infinite solutions generally exist for a problem dealt with by the invention. A planner is required to determine one of infinite solutions on the basis of his/her own experience, know-how, preference, and so on. Therefore, human-relied methods of solution have been employed heretofore.

Heretofore, a planner used a table calculating program (spreadsheet) to solve a numerical plan. In this case, because of an automatic calculating function, substitutional expressions are automatically calculated in response to modification of values. However, normal table calculating programs cannot handle bidirectional calculation (equality constraints) which is opposite calculations of a substitutional expression. In addition, normal table calculating programs cannot handle inequality constraints. Therefore, the planner himself is required to determine whether inequality constraints are satisfied or not, by calculating entire variable values while regarding equality constraints to be a substitutional expression and placing the substitutional expression on the work sheet of a table calculating program.

A simplified budget plan is taken as an example of numerical plan. Shown below is a statement on the work sheet of a table calculation program for the budget plan. Each cell is identified by a column number such as A, B, C, D, etc. and a row number such as 1, 2, 3, 4, etc. In each cell, sets of characters "item," "cash," etc. and numerical values "149659," "2.16," etc., and numerical expressions are input beforehand. Numerical expressions are input beforehand also in B2, C2, and D2 to D6. In the figure, however, definite numerical values are shown in corresponding cells because variables of the numerical expressions have been substituted by definite values.

| A | B | C | D |
|---|---|---|---|
| 1 item | budget | profit ratio | profit |
| 2 cash | 149659 | 2.16 | 1616.3 |
| 3 securities | 236008 | 7.48 | 8826.7 |
| 4 loaned money | 1045046 | 5.81 | 30358.6 |
| 5 real estate | 23404 | 0.00 | 0.0 |
| 6 total assets | 1319177 | 2.49 | 32801.6 |

This plan involves the following constraints:

$B2+B3+B4+B5=B6$ $B6=1319117$ $2.16 * B2/100=D2$ $7.48 * B4/100=D3$ $5.81 * B4/100=D4$ $0.00 * B5/100=D5$ $D2+D3+D4+D5=D6$ $B3>=200000$ $B4<=1050000$

However, the last two inequalities are not directly reflected to the table calculating program. It is required for the planner to determine variable values satisfy the inequalities.

In this example, the total assets are the sum of budgets for respective items. In addition, the budget for securities must be 200000 or more, and the budget for loaned money must be 1050000 or less. Appropriate combination of variable values must be obtained under these constraints.

There are four limits in a plan utilizing a table calculating program.

(1) Difficulty in confirming that the current solution satisfies the constraints:

A table calculation program cannot treat inequality constraints. The planner himself must examine whether the current solution satisfies all of the inequality constraints. This work increases in proportion to the amount of the inequality constraints.

(2) Impossibility of concealment of constraints from the planner:

Work is not completed only with determination of variable values satisfying equality constraints by using the table calculation program. If the current solution does not satisfy one or more of the inequality constraints, the solution must be modified to satisfy all of the constraints. Therefore, adjustment of unsatisfied inequality constraints is necessary. This is troublesome because the planner must know all of the constraints related to variables to be adjusted.

(3) Difficulty in generation of solution satisfying the constraints:

Adjustment of inequality constraints is normally performed as follows: One of unsatisfied inequality constraints is first selected in order to modify the solution to satisfy the constraints. Then variable values used in the inequality constraint is partly or entirely modified to satisfy the inequality constraint. Next, determined values are used to examine whether they satisfy the other constraints. This work is repetition of trial and error and requires a lot of labor. Nevertheless, this work does not guarantee that the planner does not fail to reach the solution satisfying the constraints.

(4) Difficulty in discovery of better solution:

The current procedure for obtaining satisfactory solution is progressed by the planner while looking into the solution, estimating a better solution, and trying a new candidate solution. Test of the new candidate is effected by the planner by modifying variable values. In this case, it is heavy work to confirm whether the new candidate is in a proper direction or not for the foregoing reasons. Further, even if it is confirmed to be in a proper direction, it is still difficult to know how far the procedure should be progressed. At present, it is necessary to try it while making new candidates at each step.

As explained above, there are many problems in solving numerical problems by means of a table calculating program, and an easier procedure for solution and a new procedure capable of obtaining a better solution more reflecting the planner's intention are desired.

Among prior art techniques related to the invention, JA PUPA 2-73458 performs bidirectional recalculation of a table calculation program; and JA PUPA 59-194258, JA PUPA 59-176821 and JA PUPA 61-229164 modify a business chart through manipulation to the screen and responsively modify corresponding numerical data. These prior art techniques, however, teach nothing to make it for a planner to instruct orientation to a better solution in an interactive manner through manipulation to graphics objects. Also on numerical planning problems on which a user had to determine a solution on the basis of vague criteria, they teach nothing how to obtain a more preferable solution in an automatic reliable manner by the operations research method using a predetermined objective function after orientation to a better solution by the planner.

SUMMARY OF THE INVENTION

This invention takes the aforementioned situation into consideration, and one of its objects is to permit a planner to progressively approach an optimum solution by using graphical user interface on numerical planning problems on which the user had to determine a solution on the basis of vague criteria.

Another object of the invention is to permit numerical planning problems intrinsically insoluble by the operations research method to be automatically and reliably solved in accordance with the planner's intention by using additional constraints responsive to orientation given by the planner.

In order to attain the objects, the invention is characterized in that variable values which satisfy constraint expressions oriented to a planning problem are displayed as graphics objects on a graphical display unit, and the variable values are iteratively modified according to guidance input by manipulation of a planner to the graphics objects on the graphical display unit, whereby the variable values are determined which satisfy the planner's intention. The constraint expressions oriented to the planning problem are input by, for example, a table calculating program. Guidance by manipulation of the planner includes constraints on modification of variable values, and modification of variable values. New variable values responsive to modification of the variable values are calculated on the basis of the constraint expressions oriented to the planning problem, constraints on modification of variable values, and a current set of variable values.

The invention is also characterized in that variable values are modified automatically by using the operations research method when variable values which satisfy the planner's intention are determined by iteratively modifying variable values which satisfy the constraint expressions oriented to the planning problem according to guidance of the planner (this case is solved intrinsically by the operations research method). More specifically, in addition to input of the constraint expressions oriented to the planning problem, input of desired constraint expressions is also received so that variable values are obtained which satisfy the problem oriented constraint expressions and the other desired constraint expressions and lead to optimization relative to the preceding solution and based on the predetermined numerical criteria. Adequacy of a plan is essentially determined by planner's complicated criteria difficult to evaluate, and the aforementioned numerical optimizing criteria are not directly related to adequacy of the plan. However, since desired constraint expressions input by the planner reflect the adequacy of the plan, that is, the planner's intention, the solution automatically progresses in a better direction. Moreover, the solution is reliably obtained.

BRIEF DESCRIPTION OF THE DRAWING

FIG. 8 is a diagram showing an OR engine 6.

FIG. 12 is a diagram explaining an aspect of input of a constraint expression.

BEST MODE FOR CARRYING OUT THE INVENTION

A planning support system according to an embodiment of the invention is described below with reference to the drawings.

Figure 1:
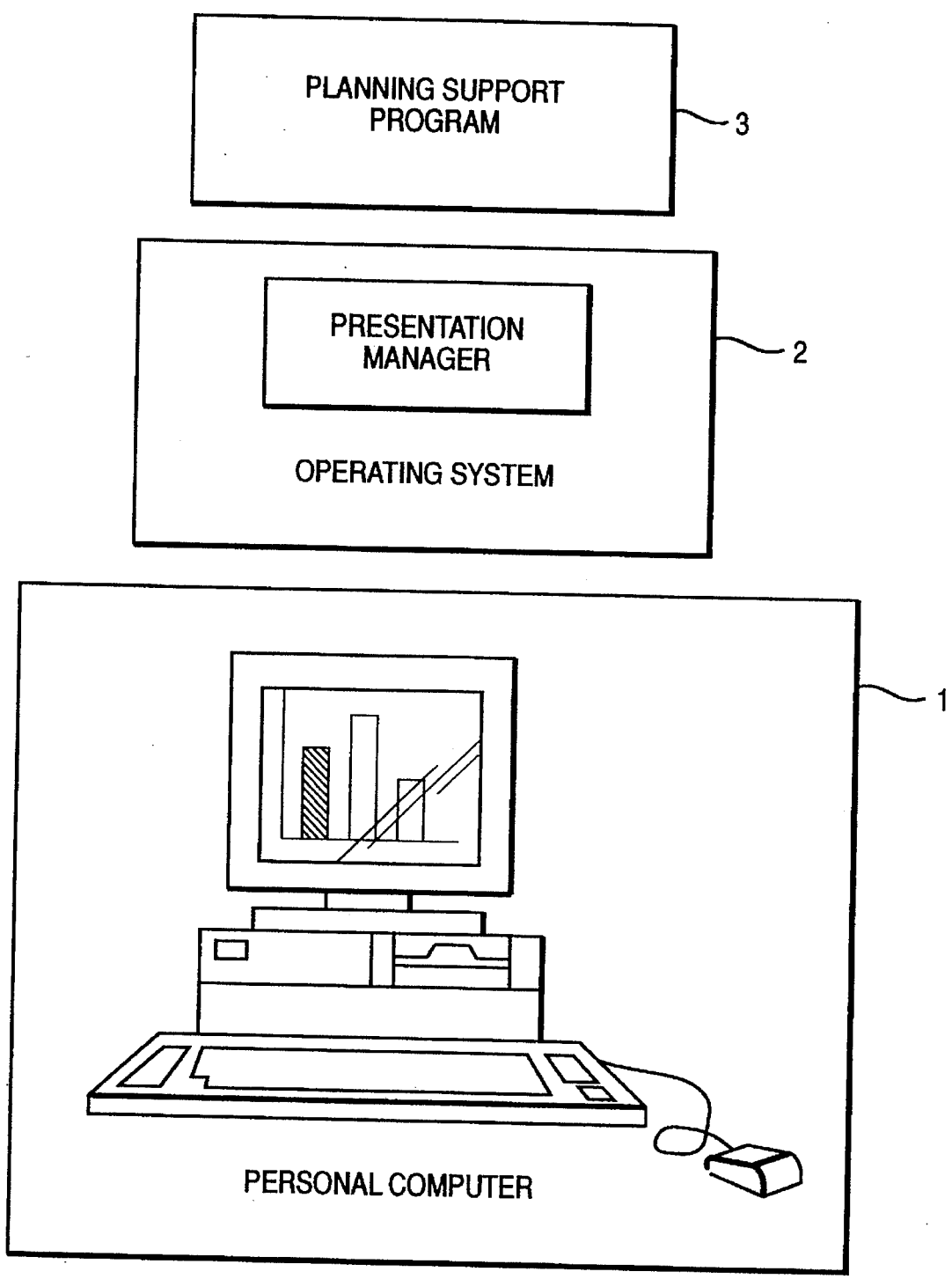
FIG. 1 is a block diagram showing the entirety of an embodiment of the invention.

FIG. 1 shows the entire arrangement of the system according to the embodiment. In FIG. 1, the system includes a personal computer 1, an operating system 2, and a planning support program 3. The personal computer 1 may be, for example, IBM PS/55 (trademark of International Business Machines Corporation) The operating system 2 may be, for example, IBM OS/2 (trademark of International Business Machines Corporation).

Figure 2:
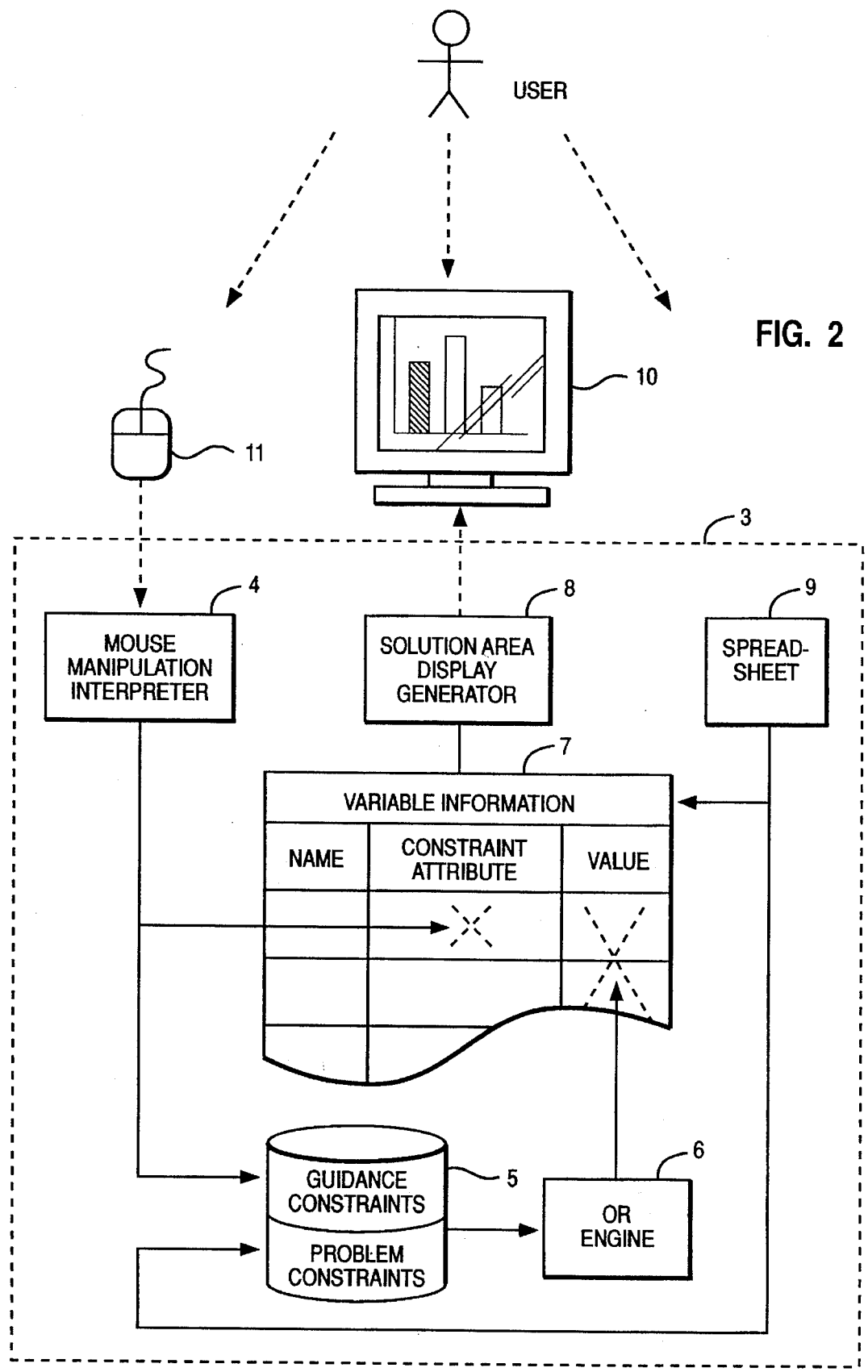
FIG. 2 is a block diagram showing construction of a planning support program 3 in the embodiment of FIG. 1.

FIG. 2 is further explanation of the arrangement of the planning support program 3 in FIG. 1. This figure shows the arrangement of the planning support program 3 as being a plurality of functional blocks; however, it is actually realized in the form of software. It may, of course, be also realized in the form of hardware.

The planning support program 3 is concerned in (1) input of constraint expressions oriented to a planning problem (hereinafter called problem constraints), (2) input of an initial program of the plan, (3) graphical display of respective variables of the plan (for example, a bar chart), (4) input of constraint expressions based on manipulation of graphics objects (constraints other than those oriented to planning problems; hereinafter called guidance constraints), and (5) generation of a new solution.

In FIG. 2, the planning support program 3 includes a mouse manipulation interpreter 4, a constraint data base 5, an OR (operations research) engine 6, a variable information table 7, a solution area display generator 8, and a spreadsheet calculator 9. The mouse manipulation interpreter 4 interprets user's motion for modification through a mouse 11 to a graph displayed on a display unit 10, and then writes the information on the variable information table 7, or alternatively, generates constraint expressions by using the information as guidance constraints and delivers them to the constraint data base 5. The spreadsheet calculator 9 may be a functional extension of a normal table calculating program. The user inputs the initial program of the plan and constraint expressions. Variable names and initial values in the initial program input into the spreadsheet calculator 9 are taken into the variable information table 7. The constraint expressions input into the spreadsheet calculator 9 are taken into the constraint data base 5 as problem constraints. The OR engine 6 takes the constraint expressions (problem constraints and guidance constraints) from the constraint data base 5, then generates one candidate solution which satisfy the constraint expressions, and writes it on the variable information table 7. The solution area display generator 8 refers to the variable information table 7 and displays the candidate solution in the form of a graph on the display unit 10.

Each of the units 4 to 9 are described below in greater detail.

First explanation is directed to the mouse manipulation interpreter 4. Motion of the user acts on the graph of the candidate solution displayed on the display unit 10 through the mouse 11. What is interpreted by the mouse-manipulation interpreter 4 is double clicks to the graph (attaching the mouse cursor to the graph and quickly presses the mouse button twice) and a drag (attaching the mouse cursor to the graph and moving the mouse while pressing the mouse button).

Figure 3:
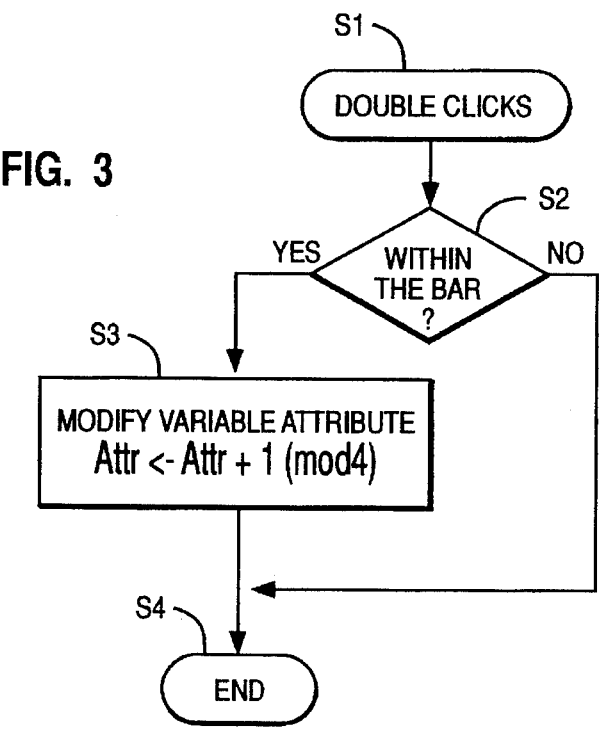
FIG. 3 is a flowchart explaining double-click process in the same embodiment.

The user can designate constraint attributes to respective variables by double clicks. The constraint attributes are four kinds of attributes: INCREASE, DECREASE, FIX, and NO CONSTRAINT. INCREASE indicates that only increase is permitted, DECREASE indicates that only decrease is permitted, and FIX indicates that there is no increase or decrease. FIG. 3 shows the flow of process responsive to double clicks. When the user performs double clicks of the button of the mouse 11, a presentation manager of the operating system 2 outputs event information indicative of the double clicks (step S1). At this time, positional information on the mouse cursor is sent together. The mouse manipulation interpreter 4 examines the position of the mouse cursor, and determines, in case of a bar chart, whether it is located in a bar or not (step S2). If the mouse cursor is within the bar, the constraint attribute of a corresponding variable in the variable information table 7 is modified (step S3), and the process ends (step S4).

Figure 4:
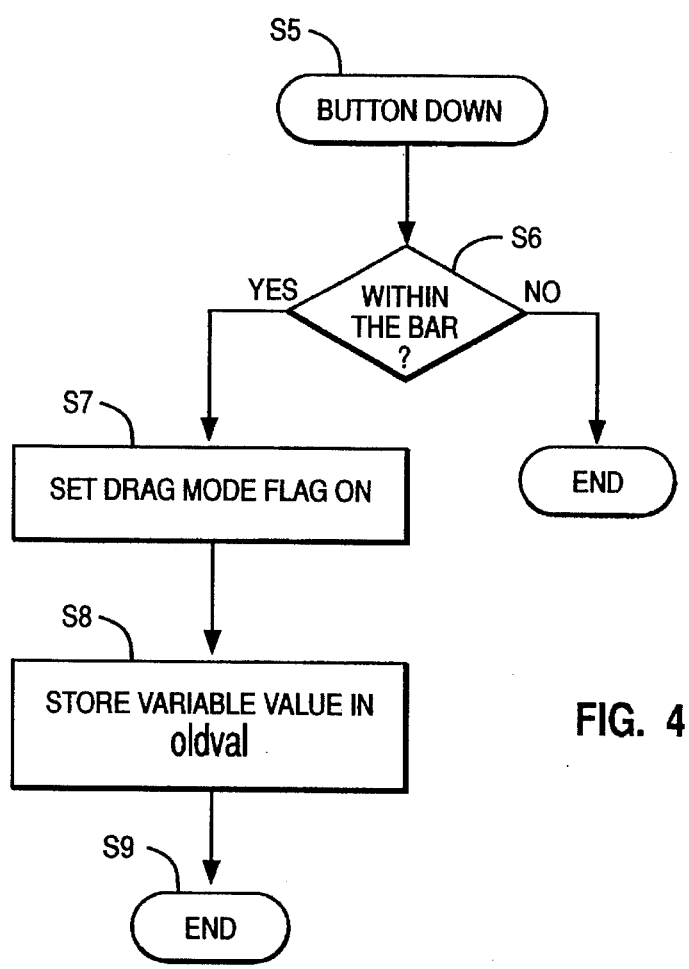
FIG. 4 is a flowchart explaining button-down process in the same embodiment.
Figure 5:
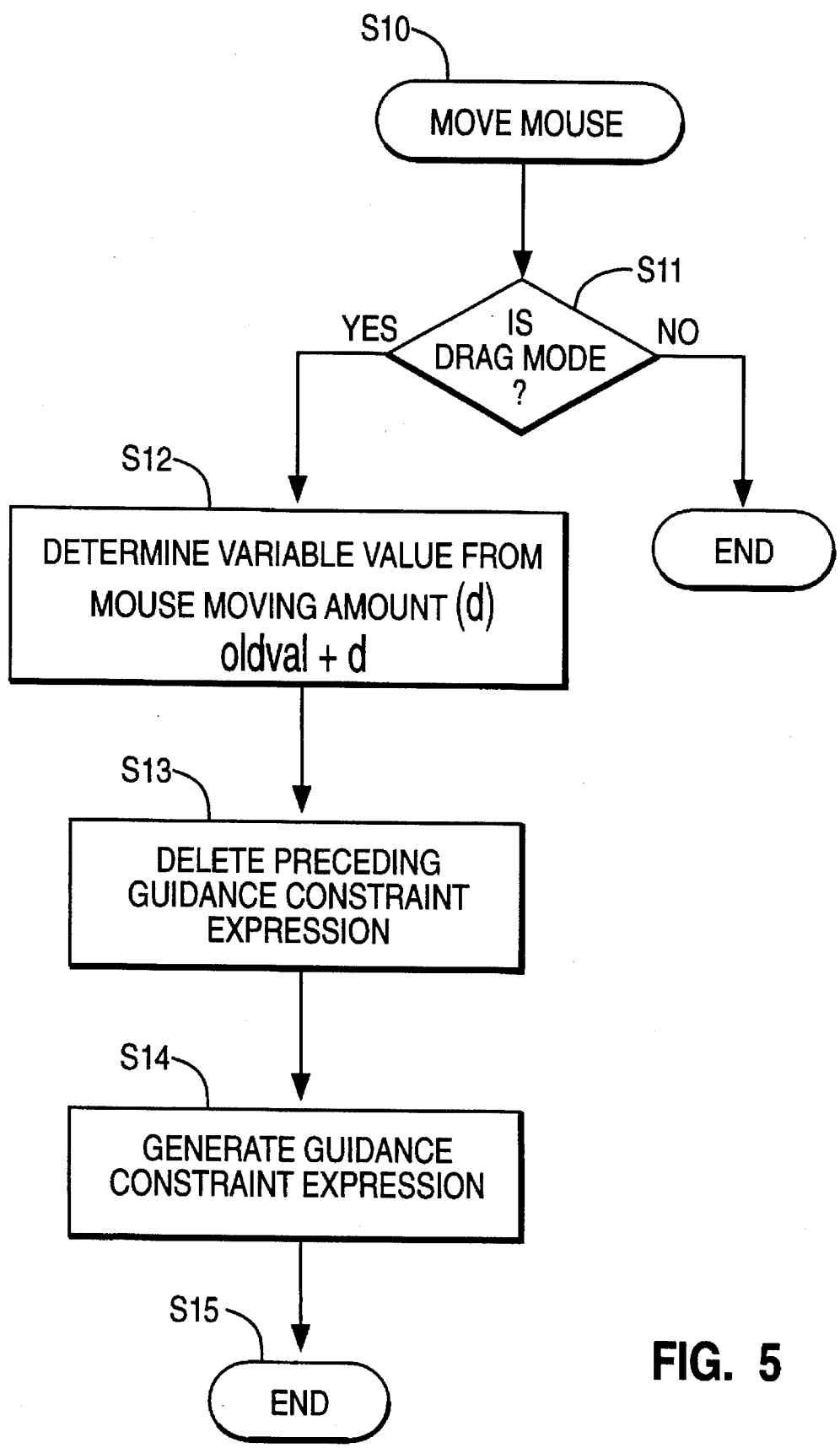
FIG. 5 is a flowchart explaining mouse moving process in the same embodiment.
Figures 6, 11:
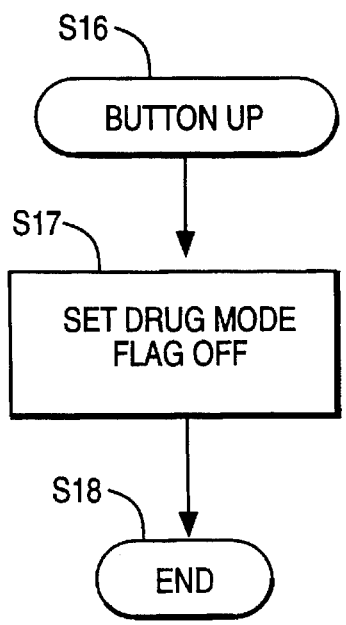
FIG. 6 is a flowchart explaining button-up process in the same embodiment.
FIG. 11 is a diagram showing a variable information table 7 in detail.

The user can also modify variable values by means of a drag. The drag starts with depression of the mouse button and, after a movement of the mouse, terminates with release of the mouse button. FIG. 4 shows the process responsive to depression of the mouse button. When the mouse button is depressed, event information is output (step S5). Then it is determined whether the mouse cursor is located in a bar or not (step S6). If in the bar, the drag mode flag is set on (step S7). Further, a corresponding variable value is stored in OLDVAL (step S8), and the process ends (step S9). FIG. 5 shows the process responsive to movements of the mouse. When the user moves the mouse, event information is output (step S10). It is first determined whether the process is the drag mode or not (step S11). If it is the drag mode, the variable value is determined from the moving amount d of the mouse (step S12). The guidance constraint expression generated in the preceding process is deleted (step S13), new guidance constraint expressions are generated (step S14), and the process ends (step S15). In step S14, a guidance constraint expression corresponding to that having the constraint attribute set in the variable information table 7 and a guidance constraint expression based on the value obtained in step S12 are generated. FIG. 6 shows the process responsive to release of the mouse button. When the user releases the mouse button, event information is output (step S16). Then the drag mode flag is set off (step S17), and the process ends (step S18).

Figure 7:
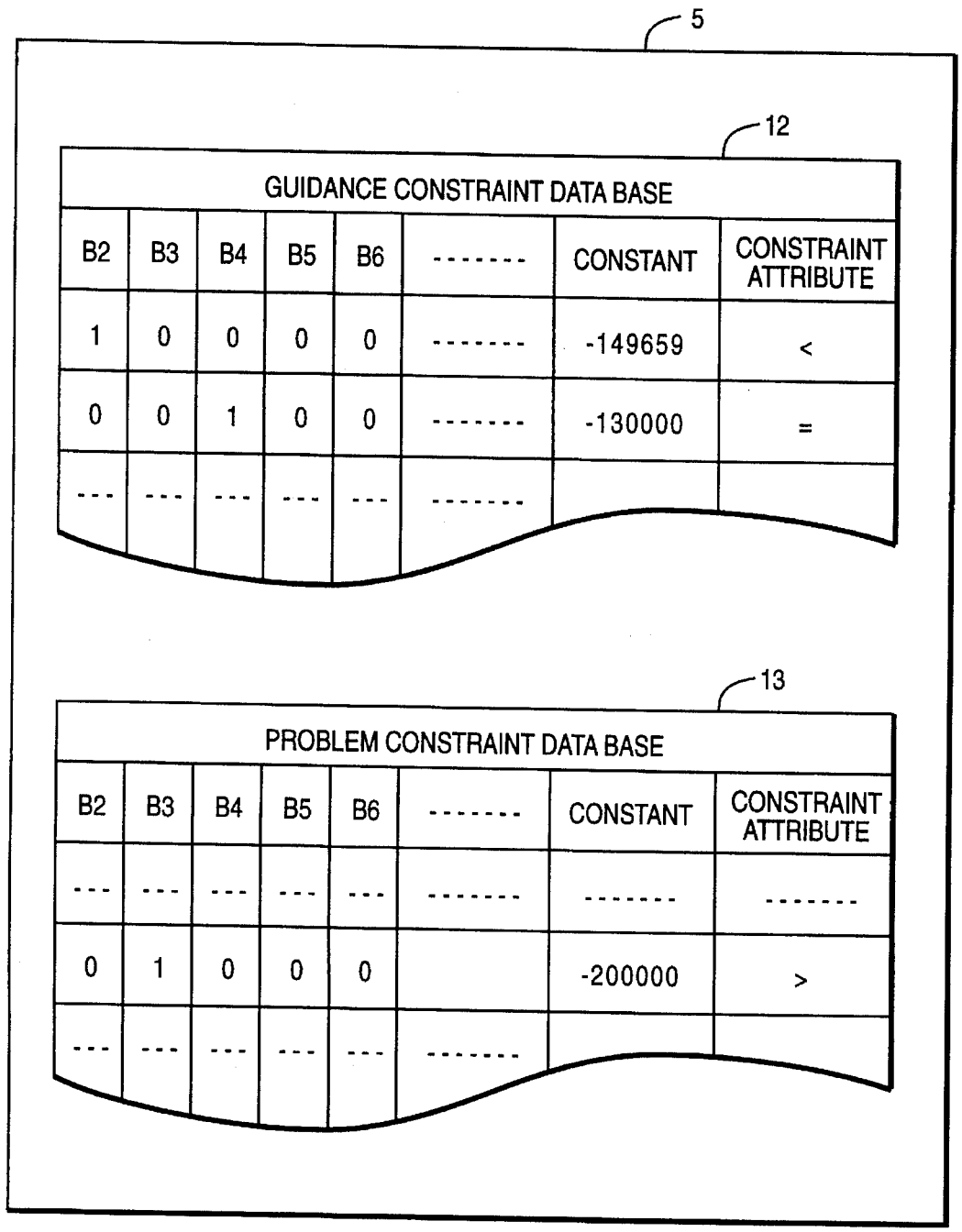
FIG. 7 is a diagram showing a constraint data base 5 in detail.

Next explanation is directed to the constraint data base 5. FIG. 7 shows the constraint data base 5 in detail. The constraint data base 5 includes a guidance constraint data base 12 and a problem constraint data base 13. The guidance constraint data base 12 manages guidance constraint expressions generated by the mouse manipulation interpreter 4 in the foregoing process. An example of guidance constraints stored in the guidance constraint data base 12 of FIG. 7 is:

$$B_2 < 149659$$

$$B_4 = 130000$$

The problem constraint data base 13 manages problem constraint expressions originally given for the numerical planning problem, and receives them from the spreadsheet calculator 9 when the planning support is started. An example of problem constraints is:

$$B_3 > 200000$$

In FIG. 7, B indicates a variable, while 1 and 0 indicate its coefficients. The constraint attribute indicates whether a linear expression, for example, $1*B_2+0*B_3+0*B_4+0*B_5+0*B_6+\ldots+(-149659)$, expressed by such variables with such coefficients and constants, is equal to, larger or smaller than zero.

Next explanation is directed to the OR engine 6. FIG. 8 explains expressions used by the OR engine 6. The OR engine 6 receives guidance constraint expressions A and problem constraint expressions B from the constraint data base 5. The OR engine 6 treats the guidance constraint expressions A and the problem constraint expressions B as constraint expressions without discrimination, and leads a set of variable values under the objective function C. This is written as a candidate solution on the variable information table 7. The objective function C indicates that the nearer the difference between a new solution and the preceding solution, the better the solution, and takes the form of a quadratic function. Respective terms of the objective function C may be weighted and added. The problem that a constraint expression is a linear equality or inequality while an objective function is a quadratic function can result in the problem of quadratic planning method of OR (operations research). There are a plurality of solutions of a quadratic planning method, and any of them may be used. This embodiment uses, for example, the quadratic simplex method. The essential idea of this procedure lies in that since increase or decrease of a quadratic function can be discriminated on the basis of the sign of its partial differential coefficient, the process ends when no further movement is possible (when the partial differential coefficient is zero for any variable) after steps of iteratively determining optimum movement amounts are repeated while selecting a variable which improves the value of the objective function by paying attention to the coefficient, and taking constraint conditions into consideration. Since it can be solved by using a quadratic planning method, explanation on its detailed process is omitted. As to details of the quadratic planning method, refer to any standard text on operations research, such as Beginner's Operation Diagrams and Research, 4-Integer Planning Method and Non-Linear Planning Method, pp. 89–101, written by H. M., translated by Kunihiro Wakayama et al., published by Baifukan.

Adequacy of a plan is essentially determined by user's complicated criteria difficult to evaluate, and optimization by the aforementioned objective function C is not directly related to adequacy of the plan. However, since guidance constraint expressions A input by the user reflects to adequacy of the plan, that is, the planner's intention, the solution automatically progresses in a better direction.

Figure 9:
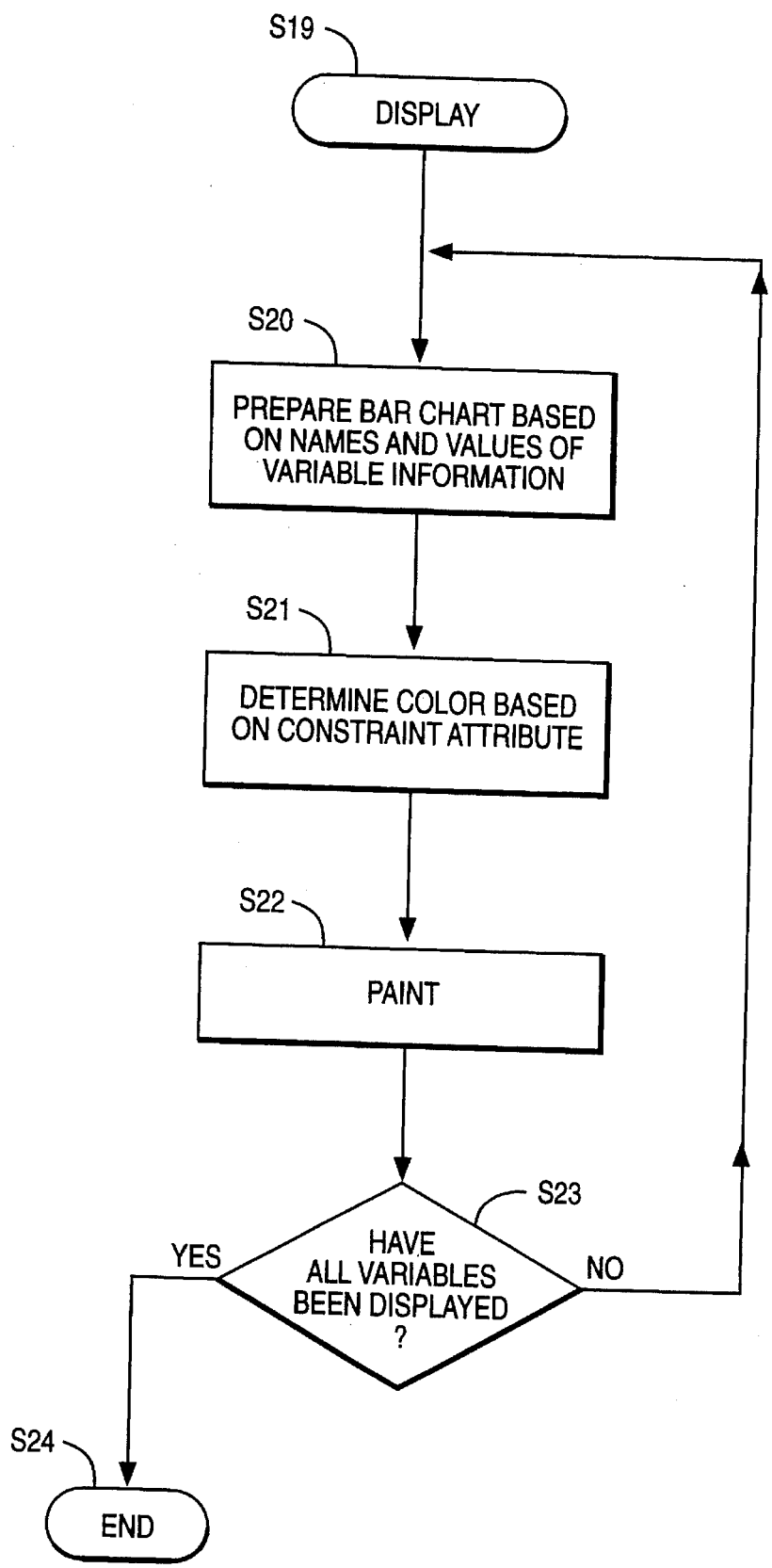
FIG. 9 is a flowchart explaining process of a solution area display generator 8.

Next explanation is directed to the solution area display generator 8. FIG. 9 explains the process by the solution area display generator 8. When any change occurs in the variable information table 7, the process begins (step S19). The frame of a bar chart is prepared on the basis of the name and the value of a variable described on the variable information table 7 (step S20), and the colors is determined painted on the basis of constraint attributes (step S21). It is examined whether all of the variables are displayed or not (step S23). If not, the process returns to step S20 and displays the bar chart of a subsequent variable, and, after all of the variables are displayed, the process ends (step S24).

Figures 10, 19:
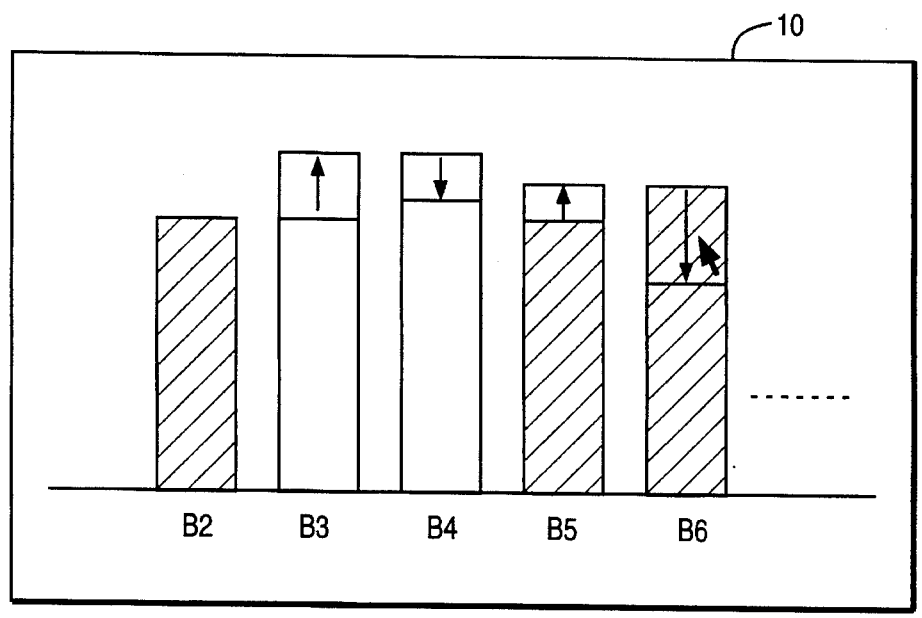
FIG. 10 is a diagram showing a spreadsheet calculator 9.
FIG. 19 is a diagram showing an aspect responsive to progress of user's planning work on the display unit.

Next explanation is directed to the spreadsheet calculator 9. The spreadsheet calculator 9 may be, for example, a unit obtained by functionally extending a normal table calculating program as shown in FIG. 10, which is capable of inputting constraint expressions. Functional extension may be effected by using macro function of the table calculating program. This will be explained later with reference to FIGS. 11 and 12. The spreadsheet calculator 9 writes initial values of the name and the variable on the variable information table 7, and delivers the constraint expressions to the problem constraint data base 13.

The variable information table 7 is explained here. FIG. 11 shows the variable information table 7. The variable information table 7 stores names, constraint attributes and values of a variable. The variable information table 7 is used by some aforementioned units for write or reference.

Figure 13:
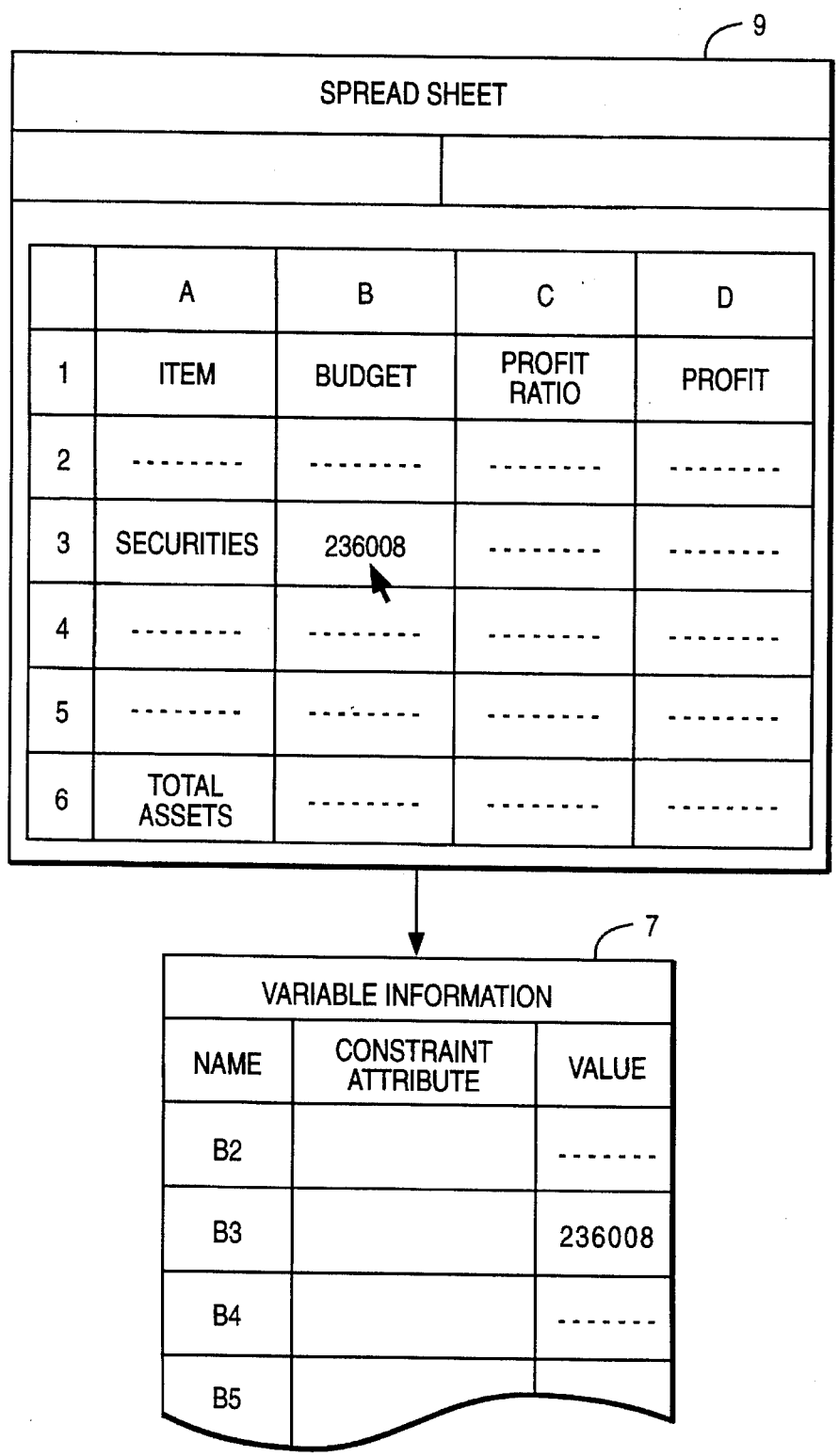
FIG. 13 is a diagram explaining the flow of information from the spreadsheet calculator 9 to the variable information table 7.
Figure 14:
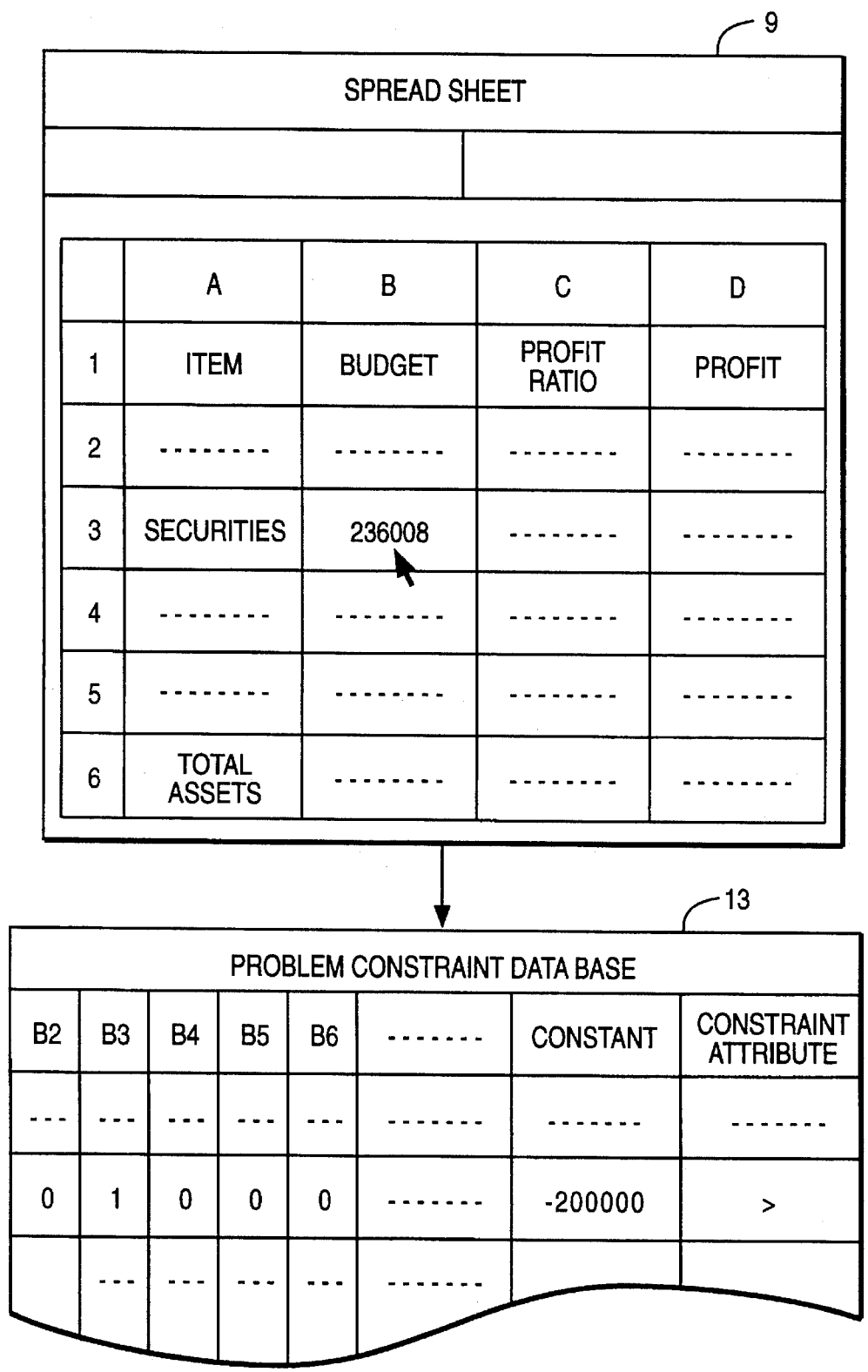
FIG. 14 is a diagram explaining the flow of information from the spreadsheet calculator 9 to a problem constraint data base 13.
Figure 15:
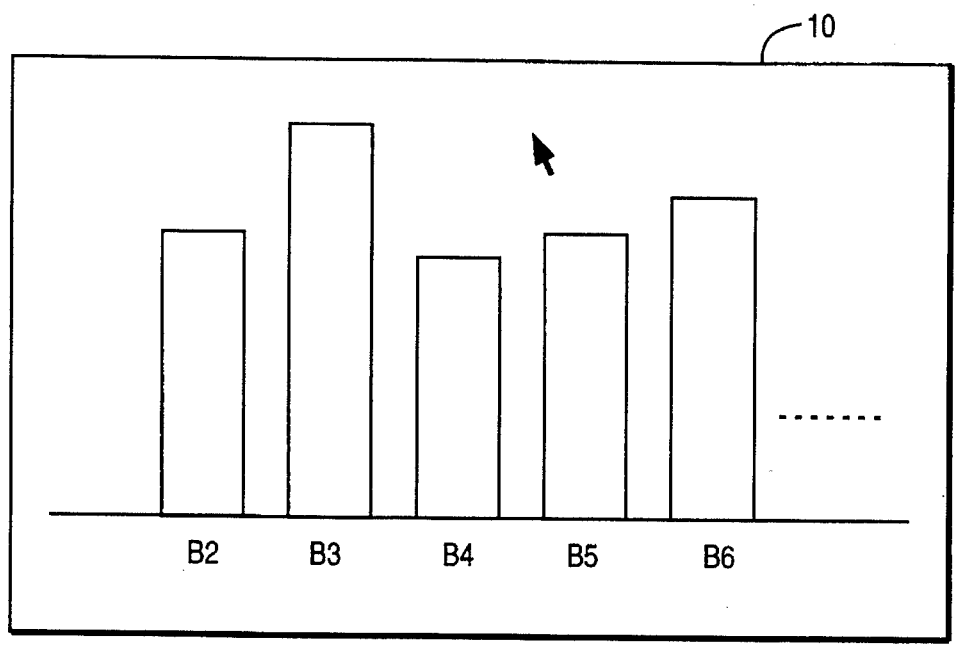
FIG. 15 is a diagram showing an example of bar chart displayed on a display unit 10.

Manipulation by the user and responsive motion of the system are briefly described below. The user first described a numerical planning problem by using the spreadsheet calculator 9. FIG. 12 explains the aspect in which constraint expressions are input. The user designates a cell in which constraints are to be input through the mouse cursor (FIG. 12A). The user next inputs constraint expressions into the constraint input field (FIG. 12B). Names and initial values of the entered plan are written on the variable information table 7 (FIG. 13). The entered constraint expressions are sent as problem constraints to the problem constraint data base 13 (FIG. 14). When the values are written on the variable information table 7, a bar chart is drawn on the display unit 10 by the abovementioned process (FIG. 9) by the solution area display generator 8 (FIG. 15).

Figure 16:
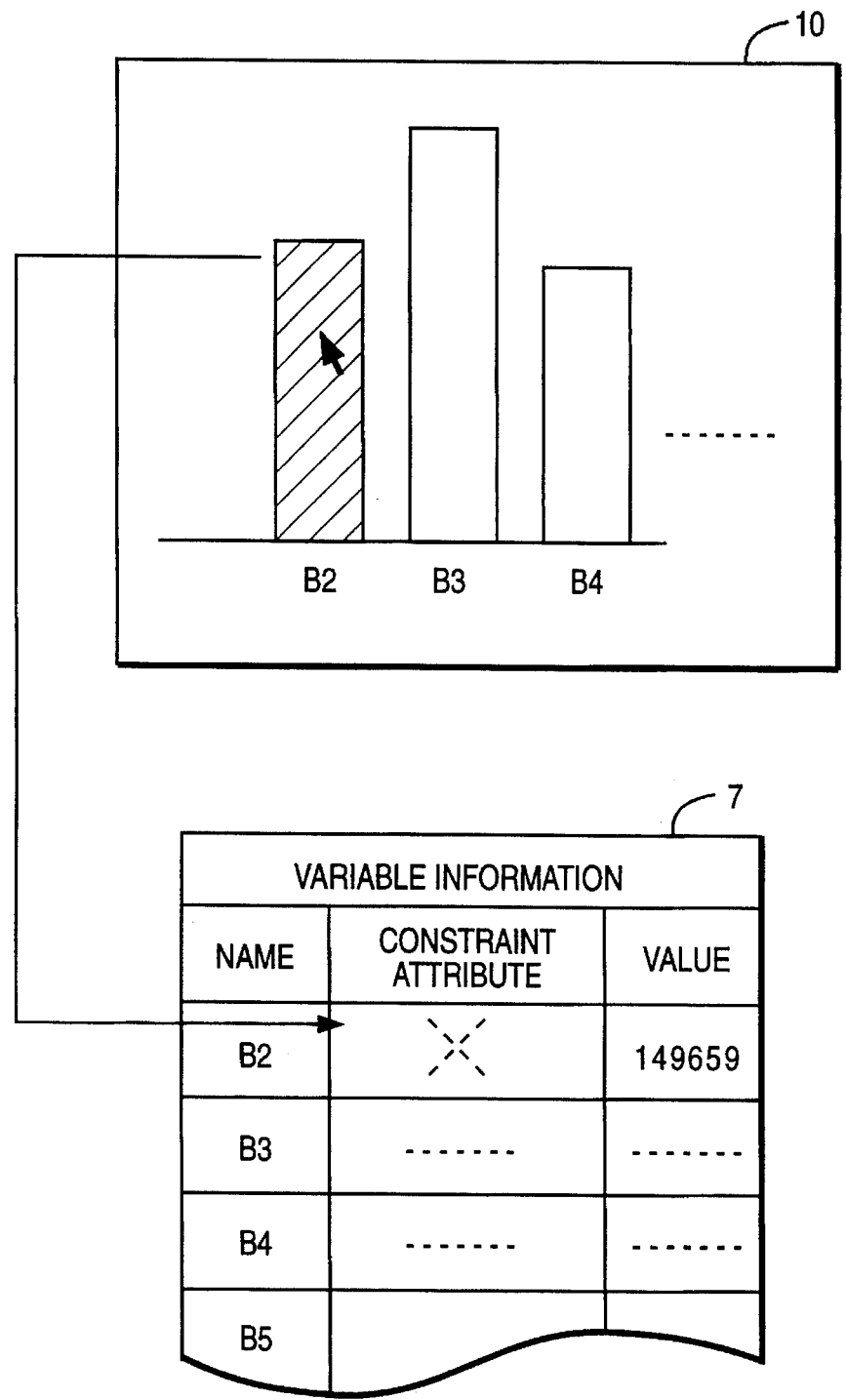
FIG. 16 is a diagram showing an aspect of the display unit 10 responsive to user's double clicks and the flow of information to the variable information table 7.

The user gives guidance constraints while referring to the bar chart. In order to set constraint attributes of, for example, variable B2, the user moves the mouse cursor into the bar of B2 and performs double clicks (upper half of FIG. 16). Constraint attributes of B2 in the variable information table 7 vary in every double clicks in the example referred to above (upper half of FIG. 16). Since a change occurs in the contents of the variable information table 7, the process of FIG. 9 is immediately started, and the color of the bar of B2 displayed on the display unit 10 changes (upper half of FIG. 16). The user repeats double clicks while confirming the color until it changes to the color of a desired constraint attribute.

Figure 18:
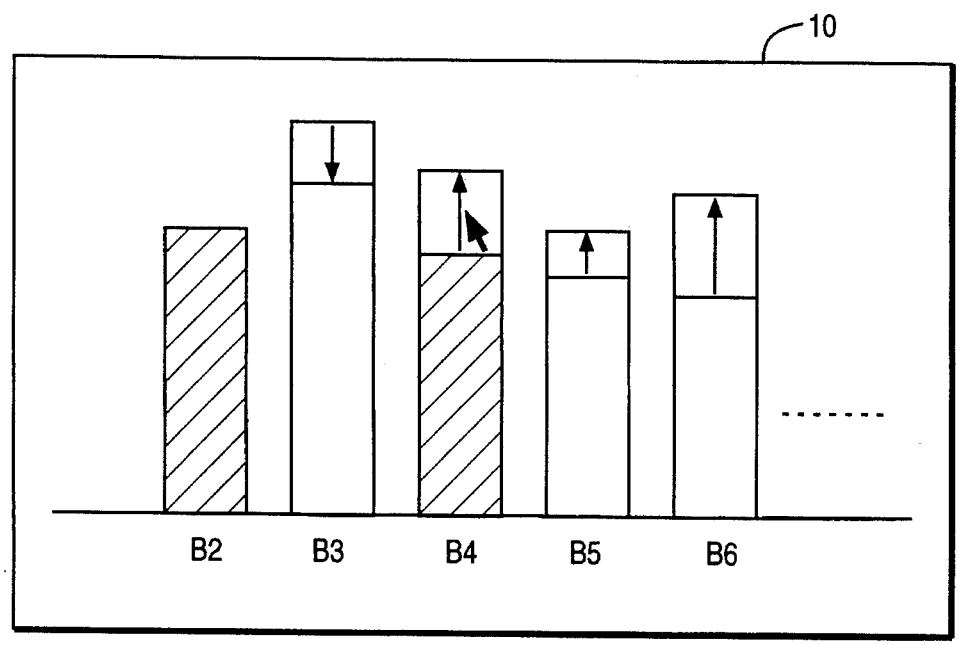
FIG. 18 is a diagram showing an aspect responsive to progress of user's planning work on the display unit 10.
Figure 17:
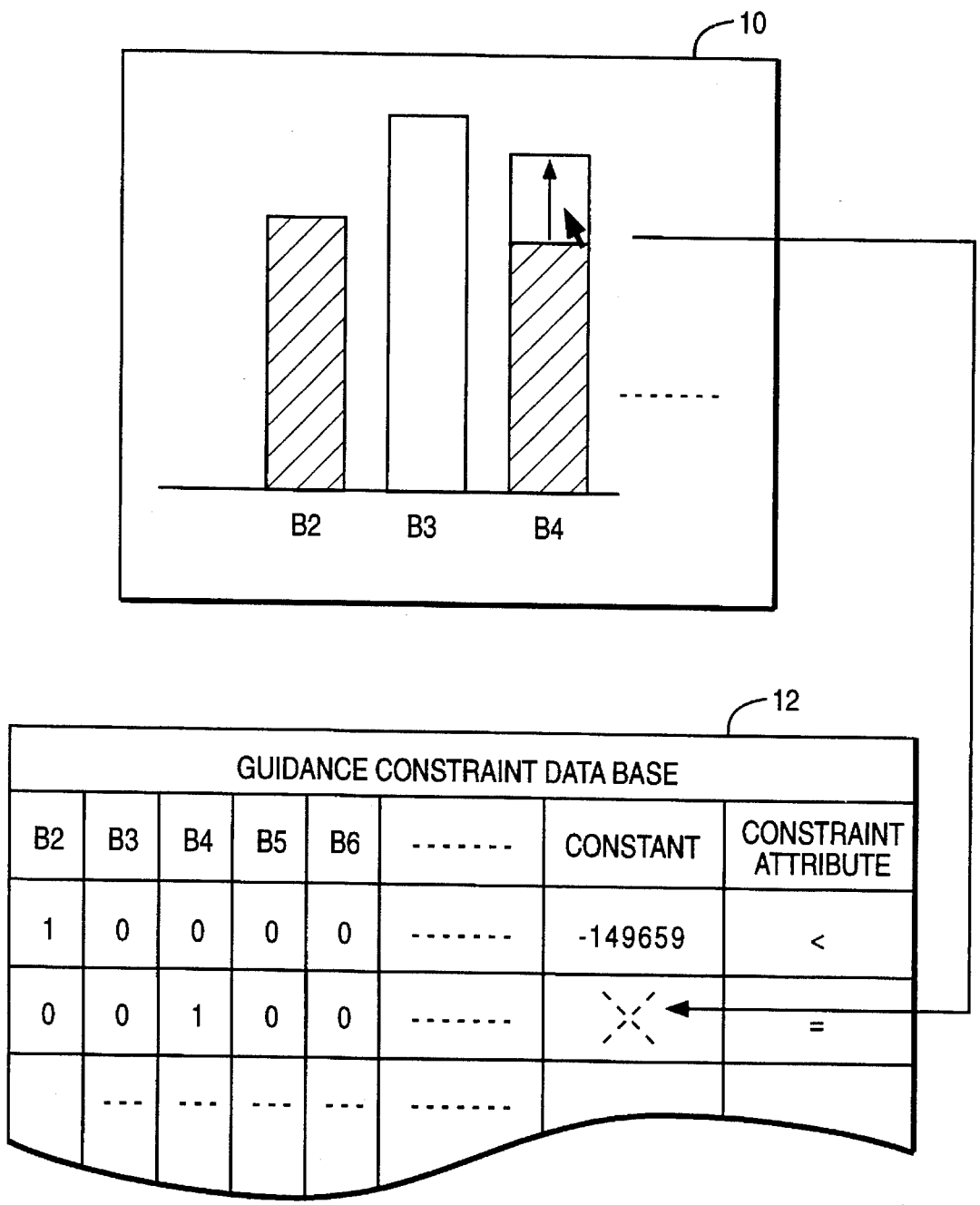
FIG. 17 is a diagram showing an aspect of the display unit 10 responsive to user's drag and the flow of information to a problem constraint data base 12.

After the user sets as many constraint attributes as he desires, he directly changes the value of, for example, B4. More specifically, he drags the bar of the variable to a desired position (upper half of FIG. 17). As the bar is dragged, the guidance constraint data base 12 is renewed from time to time (lower half of FIG. 17) by the process referred to above (FIG. 5). In this example, constant terms of the constraint equality which designates the value of B4 of the guidance constraint data base 12 is renewed from time to time. When the guidance constraint data base 12 is renewed, the OR engine 6 is started. The OR engine 6 generates a next candidate solution according to the OR process (FIG. 8) and writes it on the variable information table 7. Once the variable information table 7 is renewed, the process of FIG. 9 is started, and the display of the bar chart is renewed. Since the flow of a series of steps of the process referred to above is repeated throughout the drag, the bar chart displayed on the display unit 10 in front of the user varies as a moving picture, and the user can confirm it. For example, by dragging B4 while setting the constraint attribute for B2 to be FIX, changes shown in FIG. 18 are seen continuously. The user further repeats manipulation such as dragging B6 while setting the constraint attribute of B5 to be INCREASE (FIG. 19), and finally reaches a desired plan.

The embodiment referred to above inputs problem constraints by a table calculating program and inputs guidance constraints and modification of variable values through graphical manipulation; however, guidance constraints and modification of variable values may also be input from the table calculating program. In this case, they need not be displayed as graphics object, but may be realized as a table calculating program.

As described above, the invention makes it possible to give guidance constraints to a numerical planning problem through graphical manipulation, and a user can perform planning work in a user friendly manner. Further, the invention makes it possible to obtain a better solution by means of an operations research procedure even on a problem which was intrinsically insoluble by operations research because of the absence of numerical criterion. That is, this invention can introduce guidance constraints to the problem so that an operations research procedure with a neutral-valuable objective function can approach a better solution.

Although the present invention has been fully described above with reference to specific embodiments, other alternate embodiments may be apparent to those of ordinary skill in the art. Therefore, the above description should not be taken as limiting the scope of the present invention as defined by the appended claims.

We claim:

1. A computer implemented method for solving a numerical problem with user input comprising the steps of:
   a) receiving restrictions from computer memory including constraint expressions with at least one inequality; and
   b) iteratively solving said numerical problem with a computer processor including the steps of:
      i) determining a solution of said numerical problem with variable values that satisfy restrictions;
      ii) displaying graphical objects representing said variable values on a computer display; said step of displaying including displaying said variable values as bar charts; and
      iii) manipulating said displayed graphical objects based on user input provided through a computer input device to obtain additional restrictions; said step of manipulating including obtaining constraints on said variable values, and said step of manipulating including obtaining additional restrictions as said displayed bar charts are manipulated.

2. The method of claim 1 wherein said step of manipulating includes obtaining modifications to said constraint expressions.

3. The method of claim 2 wherein said step of obtaining modifications to said constraint expressions includes obtaining at least one additional constraint expression.

4. A computer apparatus for solving a numerical problem with user input comprising:
   a) means for receiving restrictions including constraint expressions from computer memory with at least one inequality; and
   b) means for iteratively solving said numerical problem with a computer processor including:
      i) means for determining a solution of said numerical problem with variable values that satisfy restrictions;
      ii) means for displaying graphical objects representing said variable values on a computer display; said means for displaying including means for displaying said variable values as bar charts; and
      iii) means for manipulating said displayed graphical objects based on user input through a computer input device to obtain additional restrictions; said means for manipulating including means for obtaining constraints on said variable values, and said means for manipulating including means for obtaining additional restrictions as said displayed bar charts are manipulated.

5. The apparatus of claim 4 wherein said means for manipulating includes means for obtaining modifications to said constraint expressions.

6. The apparatus of claim 5 wherein said means for obtaining modifications to said constraint expressions includes means for obtaining at least one additional constraint expression.

7. A computer system for solving a numerical problem with user input comprising:
   a) a processor for processing data;
   b) a memory coupled to said processor for storing data to be processed;
   c) means coupled to said processor for receiving restrictions from said memory including constraint expressions with at least one inequality; and
   d) means coupled to said processor for iteratively solving said numerical problem including:
      i) means for determining a solution of said numerical problem with variable values that satisfy restrictions;
      ii) means for displaying graphical objects representing said variable values on a computer display; said means for displaying including means for displaying said variable values as bar charts; and
      iii) means for manipulating said displayed graphical objects based on user input provided through a computer input device to obtain additional restrictions; said means for manipulating including means for obtaining constraints on said variable values, and said means for manipulating including means for obtaining additional restrictions as said displayed bar charts are manipulated.

8. The computer system of claim 7 wherein said means for manipulating includes means for obtaining modifications to said constraint expressions.

9. The computer system of claim 8 wherein said means for obtaining modifications to said constraint expressions includes means for obtaining at least one additional constraint expression.

10. A computer program product residing in computer memory for solving a numerical problem on a computer using user input, said computer program product comprising:
    a) means for receiving restrictions from said computer memory including constraint expressions with at least one inequality; and
    b) means for iteratively solving said numerical problem with a computer processor including:
       i) means for determining a solution of said numerical problem with variable values that satisfy restrictions;
       ii) means for displaying graphical objects representing said variable values on a computer display, wherein said means for displaying includes means for displaying said variable values as bar charts; and
       iii) means for obtaining additional restrictions based on user input provided through a computer input device as said displayed graphical objects are manipulated, wherein said means for obtaining includes means for obtaining constraints on said variable values, wherein said means for obtaining further includes means for obtaining additional restrictions as said displayed bar charts are manipulated.

11. The computer program product of claim 10 wherein said means for obtaining includes means for obtaining modifications to said constraint expressions.

12. The computer program product of claim 11 wherein said means for obtaining modifications to said constraint expressions includes means for obtaining at least one additional constraint expression.

* * * * *

UNITED STATES PATENT AND TRADEMARK OFFICE
CERTIFICATE OF CORRECTION

PATENT NO. : 5,553,212
DATED : Sept. 3, 1996
INVENTOR(S) : Etoh et al.

It is certified that error appears in the above-indentified patent and that said Letters Patent is hereby corrected as shown below:

At [22] on cover page, please change date filed from "May 18, 1992" to --May 15, 1992--

At Column 6, line 55: change "O," to --O\*-- before "B6+"

Signed and Sealed this

Tenth Day of February, 1998

BRUCE LEHMAN

*Attest:*

*Attesting Officer*             *Commissioner of Patents and Trademarks*